United States Patent [19]

Manuszak

[11] Patent Number: 5,125,674
[45] Date of Patent: Jun. 30, 1992

[54] UNITARY INFANT CARE APPARATUS

[76] Inventor: Timothy P. Manuszak, 4532 Timberwilde Dr., Kettering, Ohio 45440

[21] Appl. No.: 674,544

[22] Filed: Mar. 22, 1991

[51] Int. Cl.$^5$ .............................................. B62B 3/02
[52] U.S. Cl. ..................................... 280/30; 280/31; 280/643; 280/644; 280/648
[58] Field of Search ................. 280/643, 644, 30, 31, 280/648, 47.38; 5/93.2, 98.1, 99.1

[56] References Cited

U.S. PATENT DOCUMENTS

| | | | |
|---|---|---|---|
| 547,075 | 10/1895 | Houston | 280/31 |
| 1,460,929 | 7/1923 | Vierling | 280/31 |
| 2,134,904 | 11/1938 | Bacon, Jr. | 280/30 |
| 2,575,189 | 11/1951 | Schmidt | 5/98.1 |
| 2,595,532 | 5/1952 | Leitner | 5/99.1 |
| 2,604,333 | 7/1952 | Elmer | 280/30 |
| 2,650,375 | 9/1953 | Serrell | 5/99.1 |
| 2,777,706 | 1/1957 | Welsh | 280/31 |
| 3,079,162 | 2/1963 | Michels, Jr. | 280/7.1 |
| 3,273,862 | 9/1966 | Miller | 5/98.1 |
| 3,738,700 | 6/1973 | Terry | 297/27 |
| 4,561,138 | 12/1985 | Hwang | 5/99.1 |

FOREIGN PATENT DOCUMENTS 913625  9/1946  France ........................... 280/47.38

*Primary Examiner*—Eric D. Culbreth
*Attorney, Agent, or Firm*—Roger S. Dybvig

[57] ABSTRACT

A unitary infant care apparatus has a compartment bounded by a floor, a railing supported above the floor, and a wall extending between the floor and the railing. A seat assembly is supported in a first, generally horizontal position within the compartment and over the floor for use as a baby seat and in a second, generally vertical position folded out of the way adjacent a portion of the wall so that substantially the entire area of the compartment is unobstructed by the seat assembly in its second position for use of the apparatus as a play yard. Ground-engaging wheels and a handle are provided for use of the apparatus as a stroller. The entire apparatus is readily collapsed for easy transportation.

8 Claims, 3 Drawing Sheets

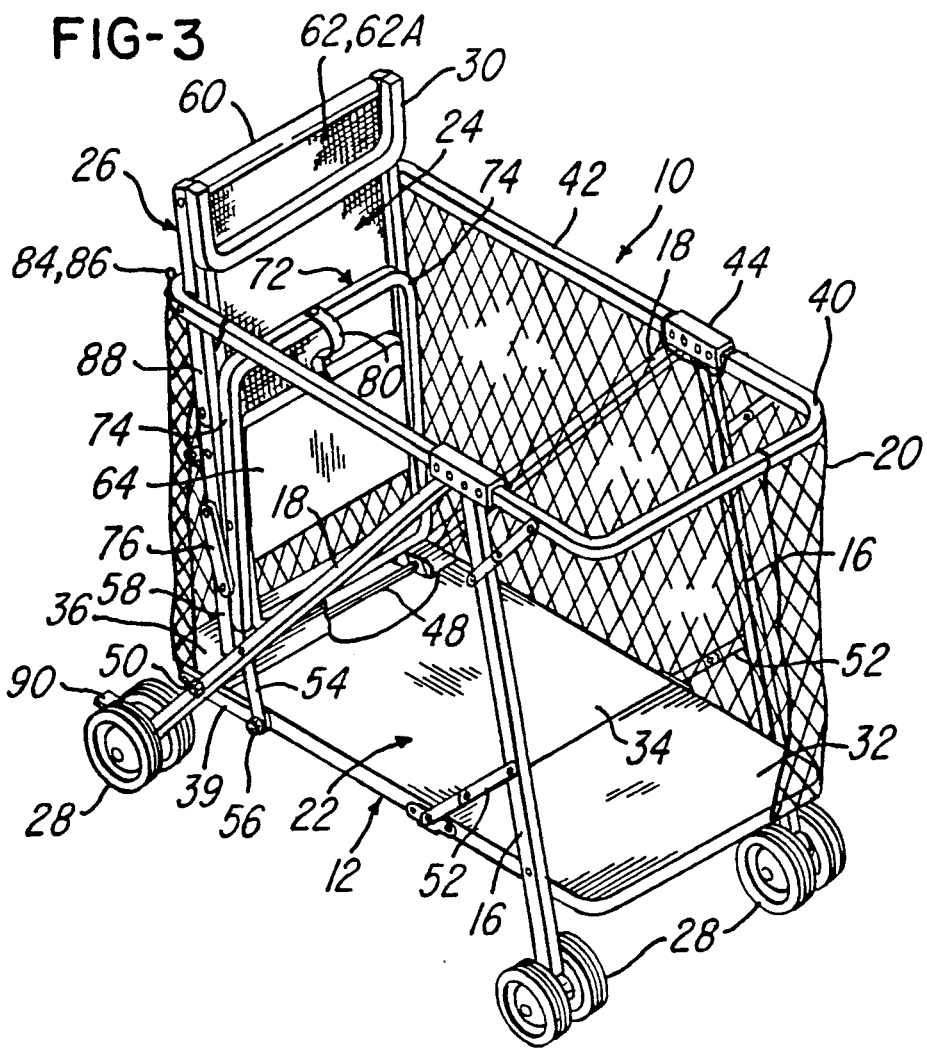
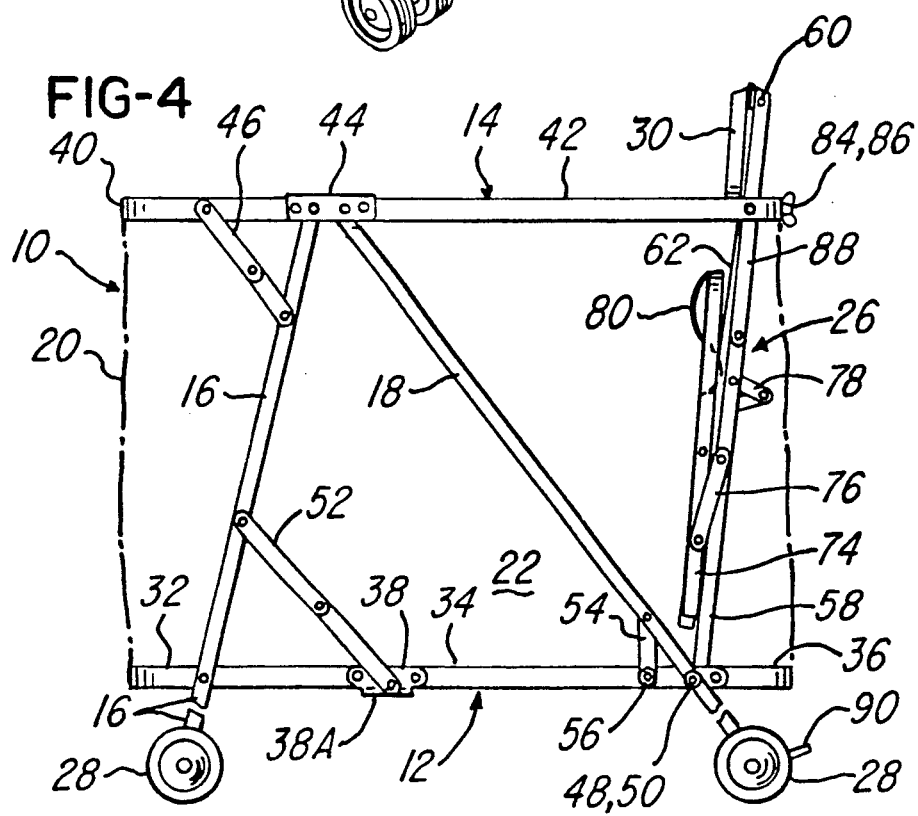

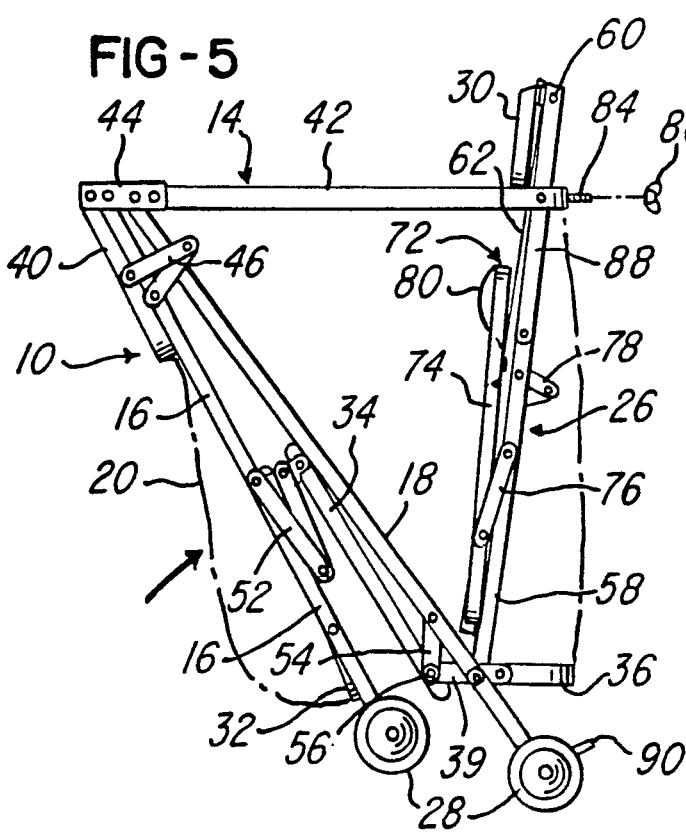
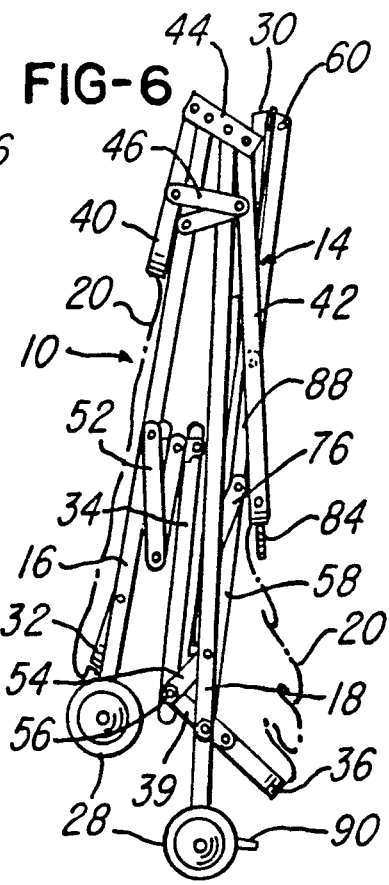
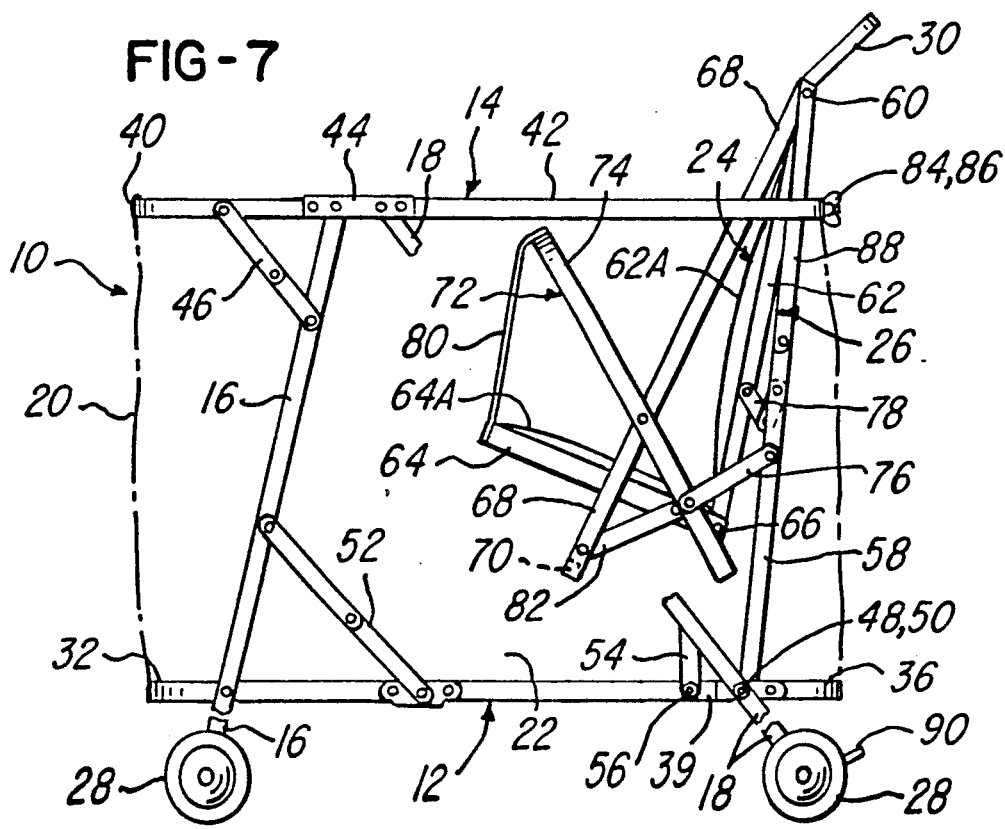

UNITARY INFANT CARE APPARATUS

SUMMARY OF THE INVENTION

This invention relates to a unitary baby care apparatus which may be used as either a stroller or a play yard and which may be easily and quickly converted from one use to the other.

Infants often seem to be content to sit in a stroller while it is moving but become impatient or cranky if for any reason the stroller is not moving. For example, an infant may be entirely content to remain in a stroller seat while it is being pushed around an amusement park but may become irritable if the person pushing the stroller has to wait in line. Relief can be provided if the infant is permitted the relative freedom of moving about in a small play yard. Of course, it would be impractical to carry a play yard when pushing a stroller. Accordingly, there is a need for an apparatus which may be rapidly converted from use as a stroller to use as a play yard and vice-versa, and especially without the need for disassembly of parts which may be awkward to handle and easily misplaced.

For the foregoing reasons, an object of this invention to provide a unitary infant care apparatus that may be used either as a stroller or as a play yard and can be rapidly converted from one of these uses to the other. A further object is to provide such an apparatus that may be converted from one use to the other without any disassembly or removal of parts.

A further object of this invention is to provide such a unitary infant care apparatus that is strong and stable in both configurations.

Another object of the present invention to provide an apparatus which is readily collapsible into a compact configuration so that it may be easily transported.

A unitary infant care apparatus in accordance with this invention comprises a generally horizontal floor, a generally horizontal railing, a railing support structure supporting the railing, and a wall extending generally vertically between the railing and the floor. The floor, the wall, and the railing define a compartment which is surrounded by the wall, is closed at its bottom by the floor, and has an open top bounded by the railing. The apparatus further comprises a seat assembly and a seat support structure supporting the seat assembly in a first, generally horizontal position within the compartment and over the floor for use as a baby seat and in a second, generally vertical position, folded out of the way adjacent a portion of the wall so that substantially the entire area of the compartment or enclosure is unobstructed by the seat assembly in its second position for use of the apparatus as a play yard. For use as a stroller, the apparatus of this invention has ground-engaging wheels supporting the floor above ground and a handle.

Preferably, the railing is provided with a front section which folds down against the front legs of the apparatus to avoid obstructing the infant's view when the apparatus is used as a stroller. The railing, the seat support structure, and the floor can be folded against one another when it is desired to collapse the apparatus for storage or transportation. The floor itself is preferably formed from multiple pivoted sections for this purpose.

Other objects and advantages of the invention will become apparent from the following description and the drawings.

BRIEF DESCRIPTION OF THE DRAWINGS

FIG. 3 is a perspective view, with parts broken away, of the apparatus of FIG. 1 shown set up for use as a play yard.

FIG. 4 is a side elevational view, with parts broken away, of the apparatus of FIG. 1 set up for use as a play yard.

FIG. 5 is a partly exploded, side elevational view of the apparatus of FIG. 1 partly collapsed.

FIG. 6 is a side elevational view similar to FIG. 5 but showing the apparatus fully collapsed.

FIG. 7 is a side elevational view, with parts broken away, of the apparatus of FIG. 1 illustrating parts as they would appear when the apparatus is being converted from a play yard to a stroller.

DETAILED DESCRIPTION

Figure 1:
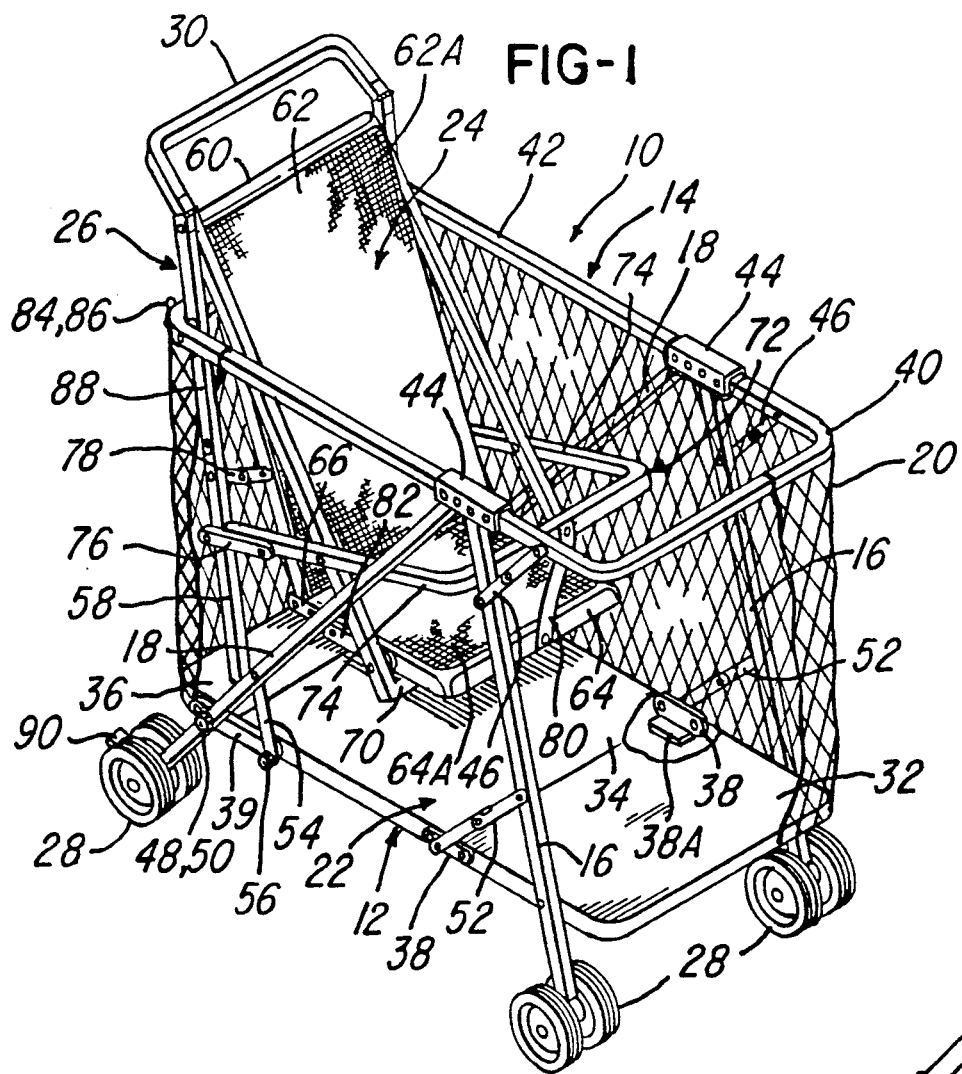
FIG. 1 is a perspective view, with parts broken away, of a unitary infant care apparatus in accordance with this invention set up for use as a stroller.
Figure 2:
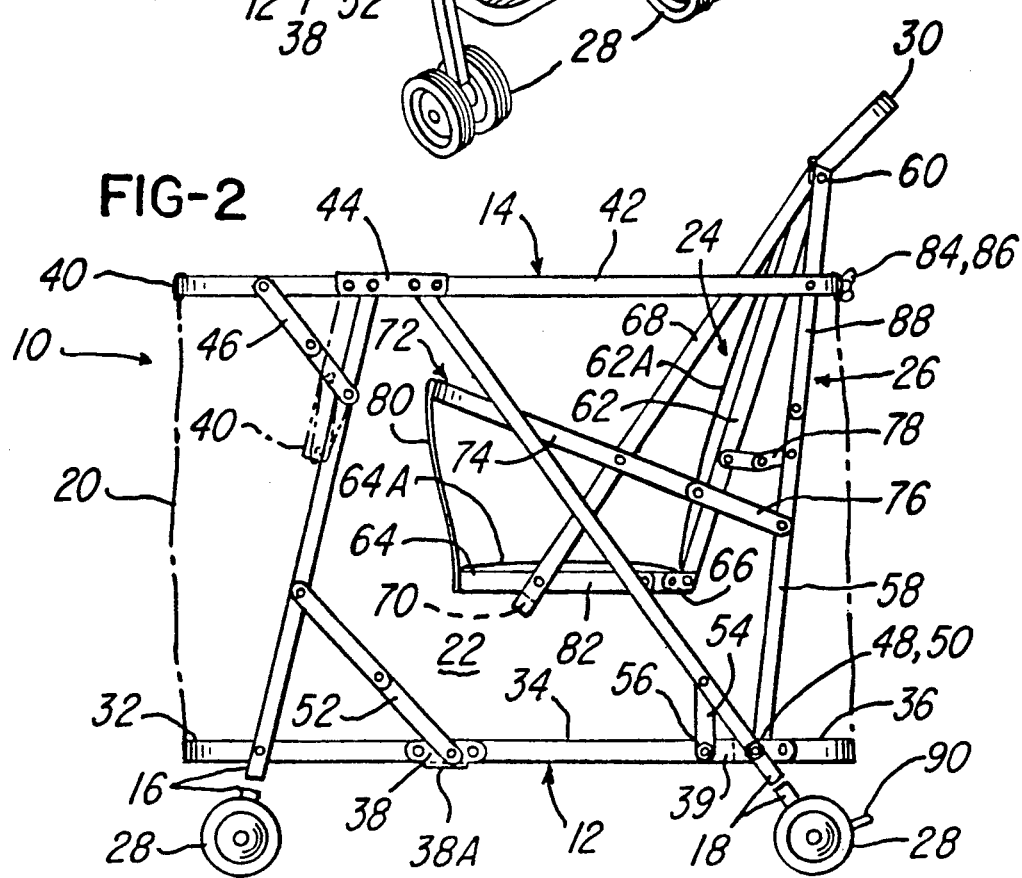
FIG. 2 is a side elevational view, with parts broken away, of the apparatus of FIG 1 set up for use as a stroller. A wall partly surrounding the stroller is shown by phantom lines in FIG>2 and in FIGS>4 through 7 described below.

With reference to FIGS. 1 and 2, a unitary infant care apparatus in accordance with this invention is generally designated 10 and comprises a floor, generally designated 12, a railing, generally designated 14, and a railing support structure comprising two pairs of legs, namely a pair of front legs 16 and a pair of rear legs 18, that support the railing 14 above the floor 12. A wall 20 extends generally vertically between the railing 14 and the floor 12. The apparatus 10 thereby has a compartment 22 surrounded by the wall 20, a bottom closed by the floor 12, and an open top bounded by the railing 14.

A baby seat assembly, generally designated 24, is mounted in the compartment 22 by a seat support structure, generally designated 26, that supports the seat assembly 24 in a first position wherein it extends generally horizontally over a substantial portion of the floor 12, as shown in FIGS. 1 and 2. With the parts thus organized, the apparatus 10 may be used a stroller and for this purpose it is provided with four groundengaging wheel assemblies 28 mounted on the lower ends of the front and rear legs 16 and 18. Further to this end, a handle 30 is mounted on the seat support structure 26 which may be gripped for guiding and pushing the apparatus 10 as it rolls along the ground.

The seat assembly 24 may also be positioned in a second position, shown in FIGS. 3 and 4, wherein it is folded adjacent the seat support structure 26 and it lies in a generally vertical orientation adjacent a portion of the wall 20 so that substantially the entire area of the compartment 22 is unobstructed by the seat assembly 24 when the apparatus 10 is used as a play yard.

To enable the apparatus 10 to be collapsed, as will be further described below, the floor 12 comprises three adjacent floor sections, namely a front section 32, a middle section 34, and a rear section 36. The adjoining edges of the front floor section 32 and the middle floor section 34 are each pivoted to a pair of coupling members 38 extending between them. Both coupling members preferably have tongues 38A extending under the adjoining edges of both the front floor section 32 and the middle floor section 34 so that these sections will not sag. The rear floor section 36 has a pair of forwardly extending arms 39 affixed thereto and straddling the rear portion of the middle floor section 34 to which the arms 39 are connected by suitable fasteners 56.

Floor sections 32, 34, and 36 may be made of any suitable rigid material, such as wood, aluminum, plastic, fiberboard, or the like material. The floor 12 may be covered by a layer of fabric (not shown) or other material. A layer of padding or a removable pad (not shown) may also be provided.

The railing 14 comprises a generally rectangular framework formed from a U-shaped first or front bow 40 and a U-shaped second or rear bow 42. Bows 40 and 42 are joined together by a pair of connectors 44 to which the bows 40 and 42 are pivotally connected. Among other purposes, this pivotal connection allows the front bow 40 either to be horizontally oriented in line with the rear railing bow 42 or, as shown by phantom lines in FIG. 2, to be pivoted downwardly against the front legs 16 to avoid obstructing the view of an infant sitting in the seat assembly 24. The front bow 40 may be held in its horizontal orientation by a pair of hinged, jointed braces 46 connected between the front bow and the front legs 16. The sections of the jointed braces 46 may be frictionally interlocked in any suitable and conventional fashion to lie in a straight line, as shown in FIGS. 1, 3 and 4 and in full lines in FIG. 2.

The railing 14 may be made of plastic, molded aluminum, steel, or any other suitable material and may be tubular or have rounded or squared edges. It may optionally be provided with a fabric covering or a layer of padding.

With reference also to FIGS. 5 and 6, the front legs 16 are pivotally connected to and extend between the front floor section 32 and the bow railing connectors 44 to provide support for both the floor 12 and the railing 14. The rear legs 18 are connected to the rear floor section 36 by a cross member or rod 48 (shown best in FIG. 3) spanning across the rear floor section 36 and having threaded ends projecting beyond the outside surfaces of both rear legs 18. Lock nuts 50 are applied to the threaded ends of the cross member 48. The upper ends of the rear legs 18 are pivotally connected to the bow railing connectors 44. Further support for the floor 12 is provided by a pair of pivoted, jointed braces 52, which may be frictionally interlocked in a straight line as with the jointed braces 46, and which extend between coupling members 38 and the front legs 16. Still further support for the floor 12 is provided by a pair of braces 54 connected to and between the rear legs 18 and the rearward end of the middle floor section 34. The braces 54 are advantageously connected to the middle floor section 34 by the fasteners 56 that connect the forward end of the arms 39 to the middle floor section 34.

The wall 20, which is flexible, is suspended from the inner edge of the railing 14 and is attached to the floor 12 such that, when the apparatus 10 is collapsed for transport or is set up for use, as will be described below, the wall 20 does not become entangled with other parts of the apparatus 10. The wall 20 may be made of any suitable material such as netting, fabric, plastic, or a combination of two or more of these materials. A combination nylon or polyester mesh material used with an imperforate vinyl panel (not shown) along the lower edge of the mesh material would make a desirable wall 20.

When the apparatus 10 is used as a stroller, the wall 20 advantageously restricts the infants legs, safely preventing the infant from engaging or becoming entangled with objects external to the apparatus 10.

The seat support structure 26 comprises a pair of upright support stanchions 58 pivotally mounted on the cross member 48 and extending through openings in the rear floor section 36. A second, seat-suspending, cross member 60 connects the upper ends of the stanchions 58 and forms a rigid framework therewith.

The seat assembly 24 includes a seat back 62 pivotally suspended from the upper, seat-suspending cross member 60 and a seat base plate or member 64 pivotally connected to the bottom of the seat back 62, as by a link 66. Both the seat back 62 and the seat base member 64 may be peripherally framed structures which are provided with padded support surfaces 62A and 64A, respectively. The seat base 64 is supported not only by the seat back 62 but also by a seat base support assembly comprising a pair of seatsupporting arms 68 that are also pivotally suspended from the upper cross member 60 and a cross piece or support braces 70 that interconnect the lower ends of the seat supporting arms 68. The seat supporting arms 68 and the cross piece 70 provide support for the front end of the seat base 64 when the seat assembly is oriented as shown in FIGS. 1 and 2 for use of the apparatus 10 as a stroller.

The position of the seat-supporting arms 68 relative to the stanchions 58 is established by a yoke, generally designated 72, having side arms 74 pivotally connected to the seat-supporting arms 68. The yoke side arms 74 are connected to the support stanchions 58 by a pair of links 76. As may be observed in FIG. 1, the links 76 restrict the distance between the point of pivotal connection of the yoke side arms 74 and the stanchions 58 so that the rearward ends of the yoke side arms 74 bear against the support stanchions 58 when the seat assembly 24 is positioned as shown in FIGS. I and 2. In other words, when the seat assembly 24 is moved into its first, generally horizontal position, the yoke side arms 74 rotate to a point such that each of the side arms 74 abuts against a respective ore of the support stanchions 58 to prevent further rotation of the side arms 74. As a result, a substantial portion of the weight of the seat assembly 24 and any object thereon will be transferred by the yoke side arms 74 to the support stanchions 58. Thus, the seat assembly 24 is supported in a cantilever fashion and it is not necessary to provide supporting legs therefor. A pair of jointed brace assemblies 78 may be provided to interconnect the support stanchions 58 and the seat back 62 to restrain the seat assembly 24 from swaying sideways.

It will be noted that the yoke side arms 74 will serve as an arm rest as well as prevent an infant from falling forwardly from the seat assembly 24. A strap 80 is preferably provided between the yoke 72 and the seat base 64 to further confine an infant to the seat assembly 24. Here it may be noted that the apparatus 10 would preferably include a conventional seat belt (not shown) which could, for example, be connected to the support stanchions 58.

With reference to FIG. 7, which shows the seat assembly 24 partly collapsed or folded toward the stanchions 58, one may fold the seat by pulling upwardly and rearwardly on the front end of the yoke 72. The seat base 64 is caused to tilt upwardly by the strap 80 and the entire assembly is thereby pulled toward the rear. To fully collapse the seat assembly 24, one may, as a final step, push rearwardly on the bottom of the raised seat base 64.

A pair of links 82 pivotally connected to and between opposite sides of the seat base 64 and the seat-supporting arms 68 are optionally provided to cooperate with the brace assemblies 78 to add stability to the seat base 64 in its various positions.

In the fully assembled position of the apparatus 10, the support stanchions 58 and the rear arm portion of the rear railing 42 are connected together by suitable fasteners, such as a pair of bolts 84 (FIG. 5) extending through apertures therein and provided with wing nuts 86. Bolts 84 and wing nuts 86 prevent the support stanchions 58 from pivoting on the lower cross member 48. Without them, the seat assembly 24 would collapse.

With reference to FIGS. 5 and 6, the floor 12 and the railing 14 of the unitary infant care apparatus 10 may be collapsed against the seat assembly 24 and the support stanchions 58 for convenience in carrying the apparatus 10. To collapse the apparatus 10 for transport or storage, the seat assembly 24 may be folded into its vertical position adjacent the stanchions 58, as described above, and the handle 30 may be folded forwardly against the stanchions 58. The front legs 16 are pushed rearwardly, as shown in FIG. 5, toward the rear legs 18, such movement being accompanied by a folding of the sections of the floor 12 toward one another in accordion fashion. The bolts 84 are then removed (if not previously removed) to disconnect the support stanchions 58 from the railing 14 so that the support stanchions 58 may be pivoted relative to the legs 16 and 18. During such movement, the rear railing bow 42 is caused to pivot about its point of attachment to the railing connector 44 by a pair of links 88 connected, respectively, to the opposite support stanchions 58 and the rear railing bow 42. Accordingly, the rear railing bow 42 is caused to fold into its position shown in FIG. 6 in generally parallel relation to the stanchions 58.

It will be evident from the foregoing description and the drawings how the collapsed apparatus 10 may be set up for use, and such is not described herein. In general, it will be apparent that the procedures taken to collapse the apparatus 10 are reversed in order to set up the apparatus 10.

The wheel assemblies 28 may be entirely conventional and will not be described in detail. The showing of the wheel assemblies 28 in the drawings is simplified. In practice, the wheel would desirably be larger, with the rear wheels optionally larger in diameter than the front wheels. As also conventional, the front wheels would preferably have pivotal joints for right and left movement. For purposes of safety and convenience, a manually operable brake, indicated by lever 90, may also be provided at one or more wheels to prevent the apparatus 10 from moving. The brake 90 may be of a type known in the prior art and will not be described herein. The handle 30 of the apparatus 10 may be provided with one or more positions (such as is also known in the art) and is constructed so as to lock in the desired position for convenience when pushing the apparatus 10 or to fold down when it is not needed.

Although the presently preferred embodiment of this invention has been described, it will be understood that within the purview of this invention various changes may be made within the scope of the appended claims.

I claim:

1. A unitary infant care apparatus comprising:
   a generally horizontal floor;
   a generally horizontal railing;
   a railing support structure supporting said railing above said floor, said support structure comprising a pair of right and left front legs and a pair of right and left rear legs;
   a wall extending generally vertically between said railing and said floor;
   said apparatus having a compartment surrounded by said wall, said compartment having a closed bottom formed by said floor and an open top bounded by said railing;
   a seat assembly;
   a seat support structure supporting said seat assembly in a first, generally horizontal position within said compartment and over said floor for use as a baby seat and in a second, generally vertical position folded out of the way adjacent a portion of said wall so that substantially the entire area of said compartment is unobstructed by said seat assembly in said second position for use of said apparatus as a play yard, said seat support structure comprising a pair of upright support stanchions, means mounting said support stanchions on the lower ends of said rear legs, means holding said support stanchions in fixed relation to said railing, and means suspending said seat assembly from the upper ends of said upright support stanchions; and
   ground-engaging wheels supporting said floor above ground; so that said apparatus may be used as a stroller.

2. The unitary infant care apparatus of claim 1 further comprising a handle for pushing said apparatus.

3. The unitary infant care apparatus of claim 1 wherein said wheels comprise four wheel assemblies, with two of said wheel assemblies connected respectively to the lower ends of said pair of right and left front legs and two of said wheel assemblies connected respectively to the lower ends of said pair of right and left rear legs.

4. A unitary infant care apparatus comprising:
   a generally horizontal floor;
   a generally horizontal railing;
   a railing support structure supporting said railing above said floor, said support structure comprising a pair of right and left front legs and a pair of right and left rear legs;
   a wall extending generally vertically between said railing and said floor;
   said apparatus having a compartment surrounded by said wall, said compartment having a closed bottom formed by said floor and an open top bounded by said railing;
   a seat assembly;
   a seat support structure supporting said seat assembly in a first, generally horizontal position within said compartment and over said floor for use as a baby seat and in a second, generally vertical position folded out of the way adjacent a portion of said wall so that substantially the entire area of said compartment is unobstructed by said seat assembly in said second position for use of said apparatus as a play yard, said seat support structure comprising a first cross member spanning between and supported by the lower ends of said rear legs, a pair of upright support stanchions mounted on said first cross member, means holding said support stanchions in fixed relation to said railing, and a second cross member spanning between and mounted to the upper ends of said stanchions in parallel relation to said first cross member, said seat assembly being suspended from said second cross member; and ground-engaging wheels supporting said floor above ground, said wheels comprising four wheel assemblies, with two of said wheel assemblies connected respectively to the lower ends of said pair of right and left front legs and two of said wheel assemblies connected respectively to the lower ends of said pair of right and left rear legs.

5. The unitary infant care apparatus of claim 4 wherein said seat assembly is suspended from said second cross member by a pair of support arms pivotally connected to said second cross member and said seat assembly is held in said first position by a yoke having a pair of legs pivotally connected to said support arms, each of said legs having one end thereof bearing against a respective one of said support stanchions when said seat assembly is in its said first position.

6. The unitary infant care apparatus of claim 5 wherein said legs of said yoke are connected to respective ones of said stanchions by a pair of links, with one end of each one of said pair of links pivotally connected to one of said stanchions and another and pivotally connected to a respective said leg of said yoke.

7. The unitary infant care apparatus of claim 6 wherein said links are sufficiently short that the mounting of said stanchions between said first cross member and said second cross member interferes with the pivotal rotation of said legs of said yoke relative to said support arms so that said legs stop their rotation to bear against said stanchions and to support said seat assembly in its said first position and to support any weight on said seat assembly.

8. The unitary infant care apparatus of claim 5 wherein said seat support structure further comprises seat support braces fixedly connected to the lower ends of said support arms and extending beneath said seat assembly such that said seat rests on said seat support braces for support in its said first position.

* * * * *